United States Patent [19]
Overdeck et al.

[11] 4,175,731
[45] Nov. 27, 1979

[54] METHOD AND MEANS FOR UTILIZING WASTE HEAT OF MOLTEN SLAG

[76] Inventors: John S. Overdeck, 425 McKinley, Hobart, Ind. 46342; John M. Overdeck, 9650R Covered Wagon Dr., Laurel, Md. 20810

[21] Appl. No.: 576,350

[22] Filed: May 12, 1975

[51] Int. Cl.² ............................................. C21B 3/04
[52] U.S. Cl. .................................... 266/142; 266/227
[58] Field of Search .................. 75/24; 266/13, 34 R, 266/35, 37, 38, 39, 142, 201, 227, 232

[56] References Cited
U.S. PATENT DOCUMENTS

| 399,125 | 3/1889 | Adams et al. | 266/13 |
| 558,648 | 4/1896 | Iles | 266/38 |
| 1,117,644 | 11/1914 | Donaldson | 266/35 |
| 1,488,436 | 3/1924 | Pugh | 266/39 |
| 1,626,292 | 4/1927 | Lund | 266/34 R |
| 2,986,458 | 5/1961 | Johnson | 266/37 |
| 3,084,925 | 4/1963 | Stauffer et al. | 266/38 X |
| 3,374,999 | 3/1968 | Burch | 266/38 X |

Primary Examiner—Paul A. Bell
Attorney, Agent, or Firm—John S. Overdeck

[57] ABSTRACT

A method and means for handling molten slag from a metallurgical furnace to recover waste heat from the molten slag and molten iron entrained in the slag. The waste heat of the slag is channeled to a heat utilizing device such as a steam generator or water heater, the molten iron is collected for return to steel making shops for further processing and the cooled and solidified slag is recovered for conventional slag processing.

10 Claims, 6 Drawing Figures

METHOD AND MEANS FOR UTILIZING WASTE HEAT OF MOLTEN SLAG

BACKGROUND OF THE INVENTION

1. Field of the Invention

This invention relates primarily to a method and means for utilizing waste heat and more particularly to a method and means for utilizing the heat of molten slag.

2. Description of the Prior Art

In the blast furnace and steel making operation, slag is formed by the action of flux upon the gangue of ore and by the oxidation of impurities in the metal. The molten slag is separated from the molten metal and poured into ladles or cars and transported to a pit area where it is discharged for solidification and further processed for granulation or otherwise made into a friable product for non-metallurgical uses such as aggregate for concrete, macadam, and bituminous products or soil conditioners. The temperature of the molten slag when discharged from the blast furnace is approximately 3000° F. and is cooled to solidification temperature for further processing. The heat dissippated during this temperature drop is wasted in the prior art procedure of handling molten slag.

FIG. 1 diagramatically illustrates the prior art practice. The slag car is filled with molten slag during the furnace tapping and transported on tracks to slag dumps for solidification. After solidification and sufficient cooling, slag breaking equipment is used to break up the solidified slag into transportable pieces which are then collected and placed in scrap cars for transportation to a conveyor run. The conveyor run is provided with means to magnetically separate the iron content of the slag pieces. The slag pieces continue to be conveyed to a crusher mill where it is particulated for further use in the slag industry. The recovered iron is collected and returned as raw material charge. During this operation, the molten slag continues to be transported to another dump area which is being filled while the first slag dump area is cleared of solidified slag. When this operation is completed, the slag crushing equipment is moved to the now solidified second slag dump area for similar removal and crushing operation.

SUMMARY OF THE INVENTION

According to the teaching of this invention, we interpose a method and means between the source of molten slag and the solidification stage of the slag, whereby the heat of the molten slag which would otherwise be wasted, is retained and channeled to a heat utilizing device such as a steam generator, water heater or other heat utilizing device.

We accomplish the objective of our invention by discharging the molten slag from the blast furnace or metal melting crucible or any other type of molten metal processing apparatus where slag is formed as a part of the metallurgical process, into a heat refractory channel or vessel such as a Pugh car for transportation to a refractory domed basin having air passageways connected to a burner chamber or heating flues of a heat utilizing device such as a boiler, to substitute for or supplement the heat medium of the burner apparatus. The molten slag is discharged into the slag basin of my invention which has a volume capacity of approximately 10,000 tons which is substantially in excess of the volume capacity of the slag vessel used in transporting the slag to the basin. The refractory floor of the basin is slanted to a nadir, at which level, a hot metal tap hole is provided from the interior to the exterior of the basin. This tap hole is provided to recover the molten iron entrained with the molten slag and which had settled to the bottom of the basin. A slag discharge opening is provided in the wall of the basin substantially elevated in level from the iron tap hole which serves as a continuous discharge for the molten slag bath when the level of the slag bath exceeds that of the slag discharge opening. The discharge is directed into a solidification pit or water cooled conveyor means for further processing according to the prior art. We further provide a slag entrance opening in the basin of our invention through which molten slag is poured into the basin from the slag ladle cars by which means the molten slag is transported from the blast furnaces to the basin. In conjunction with the basin of our invention, we provide a rail track system comprising an elevated track running alongside the slag basin so that the slag vessel may be placed in position relative to the basin whereby the Pugh car vessel may be rotated to discharge the molten slag therein into the basin through the entrance opening, and after this operation is completed a number of times, the slag vessel, when thus emptied, may be relocated on the lower level track positioned beneath the iron tap hole. The slag vessel, now being upright, becomes a receiving vessel for the molten iron recovered from the iron tap hole after the iron has precipitated from the molten slag bath to the bottom portion of the basin. The molten iron thus recovered is returned in its molten state and transported to the steel making shops for further processing. This iron recovery vessel will occur when it is determined that there is sufficient molten iron in the basin to justify having a recovery delivery.

Thus, the method and means of our invention will not only utilize otherwise wasted heat of a high order, but also provide for the recovery of molten iron.

Other objects and advantages of our invention will become more apparent upon a more careful study of the following detailed specification and accompanying drawings which describe and illustrate a preferred embodiment of our invention.

DESCRIPTION OF THE PREFERRED EMBODIMENT

Figure 1:
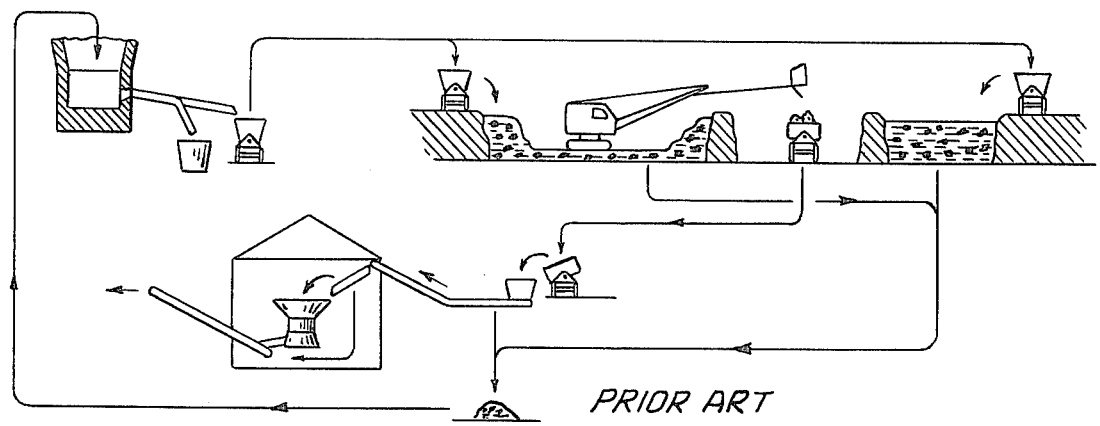
FIG. 1 is a flow diagram illustrating the prior art steps in disposing of molten slag.
Figure 2:
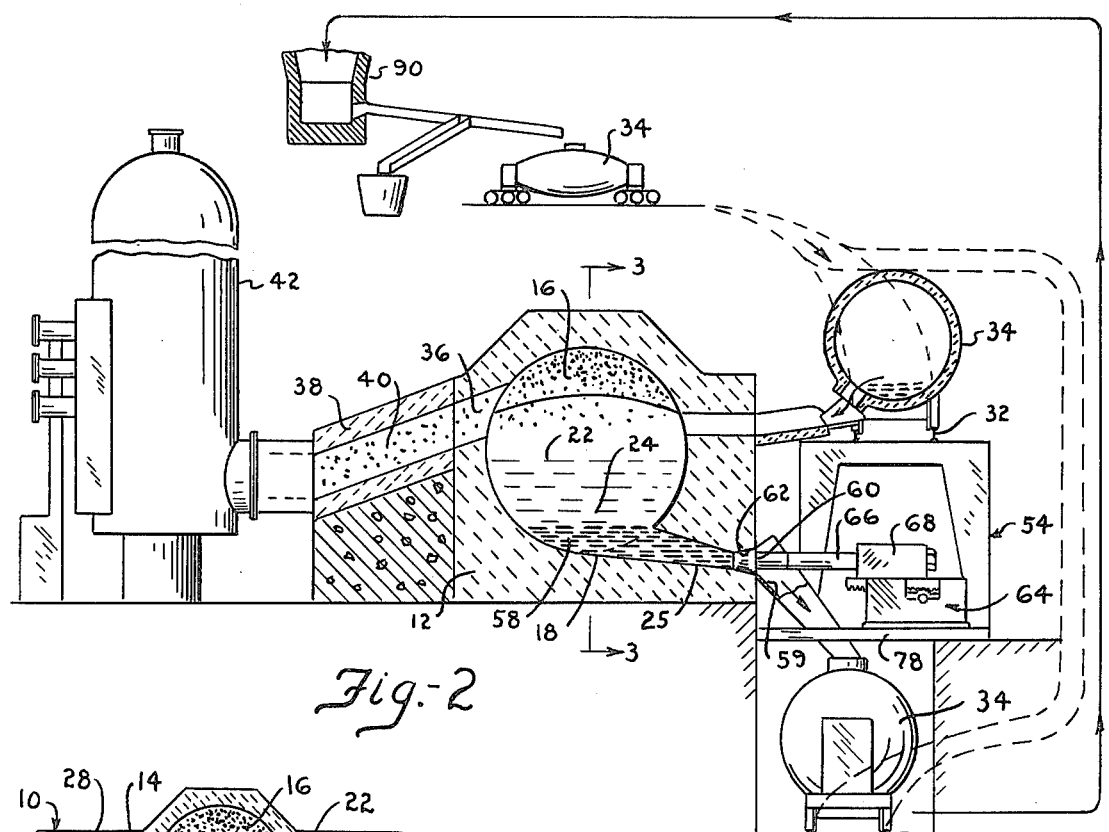
FIG. 2 is a cross section view of the heat exchange basin for molten slag showing its relationship with the heat utilizing devices and means for supplying the molten slag to the basin according to the practice of our invention.
Figure 3:
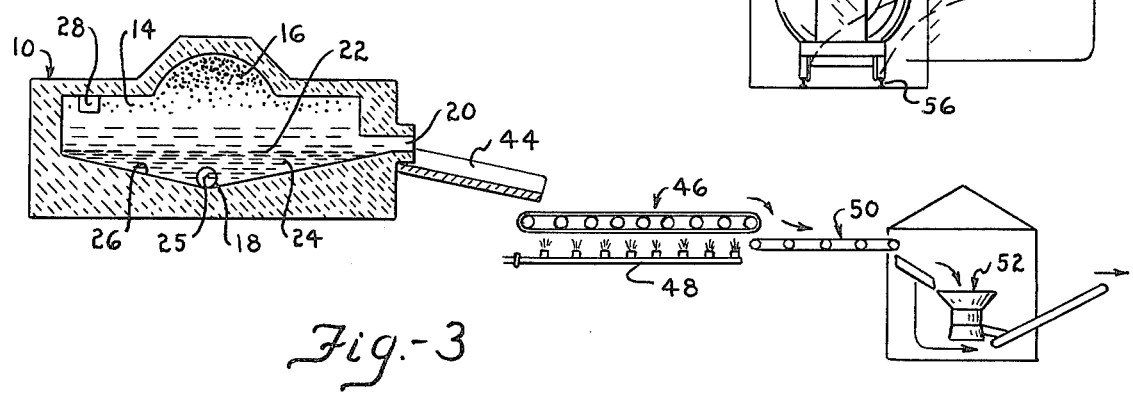
FIG. 3 is a reduced side view of the heat exchange basin longitudinally sectioned at lines 3—3 of FIG. 2, showing its relationship with the slag processing apparatus in the method of this invention.

Referring now to the drawings, particularly FIGS. 2 and 3 for the present, wherein is illustrated a preferred embodiment of this invention, numeral 10 designates generally the heat exchange reservoir basin which is constructed with refractory masonry material 12, appropriately reinforced according to conventional practice well known to the art of constructing metallurgical apparatus, having an enclosed chamber 14 the length thereof. Chamber 14 is provided with a dome 16 and floor 26 of the chamber is sloped to a low point 18. Slag outlet 20 is provided in the end wall structure of basin 10 at an elevation selected to determine level 22 of molten slag bath 24 to be retained in the basin. Iron tap outlet 25 is provided in the side wall structure of basin 10 communicating low point 18 of sloped floor 26 of basin 10 with the exterior of the basin. Slag entry opening 28 is also provided in the wall structure of basin 10 of this invention at a level above slag outlet opening 20 and at a location longitudinally distant therefrom so that the flow of molten slag from entry to discharge is maximum. The exterior of basin 10 at slag entry opening 28 is provided with runner 30 supported to extend from the basin wall and terminates adjacent rail track 32. Runner 30 receives the molten slag from slag car 34 on rail track 32. A passageway opening 36 is provided in the structure of basin 10 substantially above level 22 of molten slag bath 24, which is extended by refractory construction 38 to form a passageway 40 to communicate chamber 14 at the domed portion 16 thereof. The terminal end of structure 38 of passageway 40 is connected to a heat utilizing apparatus such as boiler apparatus 42. The basin structure of our invention is further provided with a refractory slag runner 44 at slag outlet opening 20, and is supported in any convenient manner to slope over a steel bed conveyor apparatus 46, which is cooled by water spray means 48, on which the basin discharged molten slag solidifies during the conveyor travel. At the end of the conveyor travel, the solidified slag is discharged on a second conveyor apparatus 50 by which it is transported to the hopper of a crusher mill 52 where it is particulated for other use and purposes.

Figure 6:
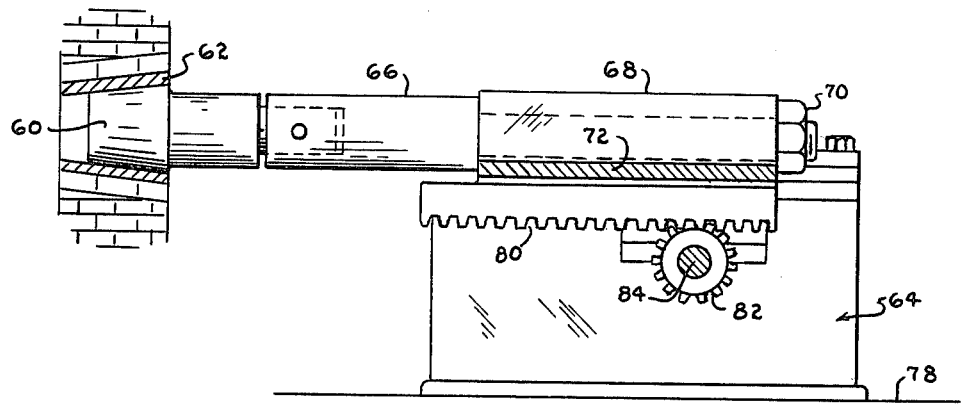
FIG. 6 is a side view of the stopper rod drive mechanism sectioned along lines 6—6 of FIG. 5, showing the stopper rod in operative relation with the iron tap hole.

Slag entry opening 28 and iron tap outlet 25 are provided on the same side of basin 10 so that double deck rail track structure 54 may be used to position slag car 34 for both openings 28 and 25 with minimum switching. Accordingly, I provide one track 32 at an elevation to raise the slag ladle car 34 above the slag entry 28 to discharge the molten slag from multiple slag car deliveries onto runner 30 and into the basin through opening 28. The other track 56 is at an elevation below iron tap outlet 25 so that slag car 34 may be positioned thereunder when empty to receive the accumulated molten iron 58 which settled from the molten slag bath 24. Iron tap outlet 25 is plugged with a tungsten plunger 60 seated into a tungsten cone 62 as shown in FIG. 6, during the slag deposit operation of this invention when iron tap outlet 25 is unplugged. A conveniently supported runner 59 is supported to channel the molten iron flow from outlet 25 to slag car 34. When the iron content of molten bath in the basin increases to a volume that will substantially fill the emptied slag car, slag car 34 is positioned on track 56 to receive the molten iron 58 from outlet 25, and the drive mechanism of stopper 60 is operated to open iron tap outlet 25 to recover the molten iron.

Figure 5:
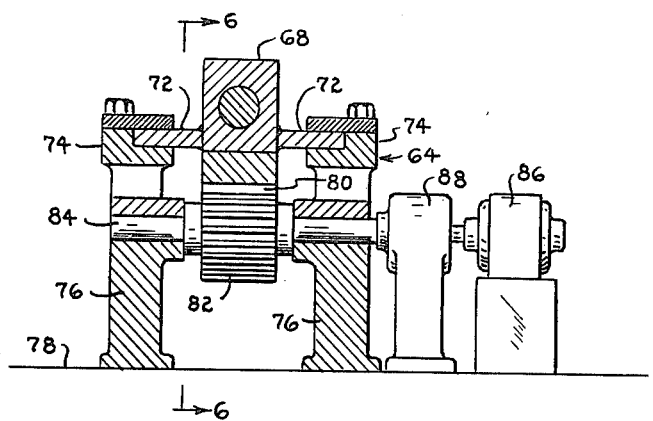
FIG. 5 is an end view of the stopper rod drive mechanism sectioned along lines 5—5 of FIG. 4.
Figure 4:
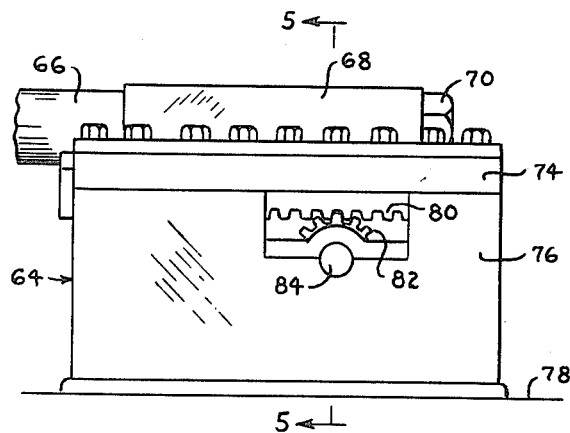
FIG. 4 is a side view of the stopper rod drive mechanism for the iron tap hole of the heat exchange basin, the stopper rod is shown in fragment.

In this connection, the mechanism which operates stopper 60 to seat in cone 62 of iron tap outlet 25 is generally designated by the numeral 64 and is more clearly illustrated in FIGS. 4, 5 and 6. Mechanism 64 comprises stopper head 60 mounted at the distal end of rod 66 supported on carrier block 68 secured thereto by means of threaded connection 70. Carrier block 68 is provided with lateral guide plates 72 which are supported on and guided to longitudinally slide on table mounts 74. Table mounts 74 are laterally spaced apart one being on each side of carrier block 68 and forming the top side of pedestals 76 mounted on floor beam 78. The bottom side of carrier block 68 is provided with gear teeth 80 which engage gear 82 positioned therebelow supported on shaft 84. Shaft 84 is supported on bearing surfaces provided in pedestals 76 for rotation and is connected at one end thereof to motor drive 86 through speed reducers 88.

It is understood that mechanism 64 shown in FIGS. 4, 5 and 6 are illustrative only since the drive operation of stopper rod 66 may be accomplished by any convenient means and the support of mechanism 64 adjacent basin 10 at iron tap outlet 25 may be constructed to accommodate the structure of basin 10 and rail track structure 54.

In the operation of our invention, we provide heat exchange basin 10 positioned adjacent a heat utilizing apparatus 42 on one side thereof, the slag discharge and crusher apparatus' 44, 46, 50 and 52, on another side of the basin of our invention, and the track means 54 and 56 for transporting molten slag to the basin of our invention and removing accumulated iron therefrom at yet another side of basin 10 of our invention so that heat exchange basin 10 is the central point for receiving and storing a large volume of molten slag in a bath, recovering and channeling the heat of the molten slag bath to heat utilizing apparatus, recovering cooled molten slag and transporting it by conveyor apparatus 46, 50 for solidification and ultimately granulation operation in crusher mill 52, and recovery of accumulated molten iron for further use for completing the cycle of our invention.

Molten slag is discharged from furnace 90 into slag car 34 which, when filled with molten slag, is driven on tracks 32 onto upper deck rail track structure 54 and positioned thereon so that when the body of car 34 is revolved on its axis, the molten slag is discharged onto runner 30 through entrance opening 38 into basin 10. Slag car 34 is thus shuttled back and forth until a bath of molten slag 24 is formed and level 22 is reached. Further delivery of molten slag will cause the molten slag adjacent outlet opening 20 to discharge into slag runner 44. Since slag inlet 28 is longitudinally distant from outlet opening 20, the temperature of the molten slag adjacent outlet opening 20 will be sufficiently low so that upon discharge onto slag runner 44, the slag will be ready for solidification. The heat thereof being lost to the air in the chamber of the basin during the longitudinal travel of the molten slag from the entrance thereof to its discharge. The slag thus discharged falling on conveyor apparatus 46 will be solidified and further cooled and then discharged from the conveyor into the hopper of crusher apparatus 52. The air in the chamber of basin 10 being heated by the molten slag bath 24 will rise to accumulate in dome 16 of basin 10 from where it is channeled through passageway 40 into the heating chamber of boiler apparatus 42 by the flue stack current of the boiler apparatus 42.

Since we contemplate the volume of the molten slag bath 24 to be very large, on the order of 10,000 tons for example, so that the longitudinal travel of the molten slag from the entrance thereof to the discharge will be relatively slow, slag bath 24 will remain substantially quiescent allowing precipitation of the iron content entrailed in the slag to settle to the bottom of the basin. The volume amount of iron precipitated may be monitored by any convenient means known to the prior art, such as having electrodes in the wall of the basin 10 (not shown) to record when the iron has reached a level desired for removal from the basin. Empty slag car 34 may then be positioned on bottom rail track 56 beneath iron tap outlet 25 preparatory to receiving the accumulated molten iron. A runner may be provided and supported in any convenient manner to channel the molten iron from outlet 25 into the opening of car 34. Outlet 25 is plugged by means of stopper head 60 seated in cone 62 forming the mouth of iron tap outlet 25. To discharge the iron 58 from basin 10, stopper head 60, which is connected to stopper rod 66, is withdrawn from cone 62 by operation of drive mechanism 64 until the molten iron 58 is removed from basin 10 whereupon drive mechanism 64 is activated to re-seat stopper head 60 into cone 62 to close iron tap outlet 25. Car 34 is removed with its molten iron content to be discharged in shops for further processing.

What we claim is:

1. A waste heat and molten metal recovery system comprising:
   a molten slag producing apparatus;
   a reservoir basin for said molten slag, said basin comprising end walls, side walls, a floor, and a cover, a slag discharge opening in one of said end walls of said basin, said floor being slanted upward toward said slag discharge opening, a plugged aperture in a side wall of said basin at the nadir of said floor slant, and a slag entry aperture in said side wall of said basin elevated above the level of said slag discharge opening and adjacent the other end wall of said basin;
   a slag conveying means exterior of said basin at said slag discharge opening of said basin;
   a heat utilizing apparatus exterior of said basin;
   a heat insulated passageway connecting said basin and said heat utilizing apparatus and communicating the interior of said basin above said slag discharge opening with said heat utilizing apparatus;
   track means between said slag producing apparatus and said slag entry aperture of said basin;
   a second track means extending from said first mentioned track means to below said plugged aperture of said basin; and
   a vessel movable on said first and second track means for receiving molten slag from said slag producing apparatus and discharging said molten slag through said slag entry aperture into said basin, and for receiving molten metal from said plugged aperture when unplugged.

2. The waste heat recovery system of claim 1 wherein said cover of said basin is further characterized as being domed for containing the air in said basin heated by said molten slag in said basin.

3. The waste heat recovery system of claim 2 wherein said heat insulated passageway is further characterized as connecting said basin at said domed part thereof.

4. The waste heat recovery system of claim 1 wherein said first and second track means are further characterized as being double decked at said basin to selectively position said vessel movable thereon in proximity with said slag entry aperture of said basin, and in proximity with said plugged aperture of said basin.

5. The waste heat recovery system of claim 4 wherein said plugged aperture of said basin is further characterized as being unplugged by metallurgical tapping apparatus.

6. A waste heat and metal recovery system comprising:
   a molten slag and metal producing apparatus;
   a reservoir basin for said molten slag and metal, said basin comprising end walls, side walls, a floor, and a cover, a slag discharge opening in one of said end walls of said basin, said floor being slanted upward toward said slag discharge opening, a metal tapping aperture in a side wall of said basin at the nadir of said floor slant, and a slag entry aperture in said side wall of said basin elevated above the level of said slag discharge opening and adjacent the other end wall of said basin;
   a slag conveying means exterior of said basin at said slag discharge opening of said basin;
   a heat utilizing apparatus exterior of said basin;
   a heat insulated passageway connecting said basin and said heat utilizing apparatus and communicating the interior of said basin above said slag discharge opening with said heat utilizing apparatus;
   track means between said slag and metal producing apparatus and said slag entry aperture of said basin;
   a second track means extending from said first mentioned track means to below said metal tapping aperture;
   a vessel movable on said first and second track means for receiving molten slag and metal from said slag and metal producing apparatus and discharging said molten slag and metal through said slag and metal entry aperture into said basin, and for receiving molten metal from said metal tapping aperture; and
   a metallurgical tapping apparatus exterior of said basin for selectively closing and opening said metal tapping aperture.

7. The waste heat and metal recovery system of claim 6 wherein said cover of said basin is further characterized as being domed for containing the air in said basin heated by said molten slag in said basin.

8. The waste heat and metal recovery system of claim 7 wherein said heat insulated passageway is further characterized as connecting said basin at said domed part thereof.

9. The waste heat and metal recovery system of claim 6 wherein said first and second track means are further characterized as being double decked at said basin to selectively position said vessel movable thereon in proximity with said slag entry aperture of said basin, and in proximity with said closed aperture in said wall of said basin.

10. The waste heat and metal recovery system of claim 9 wherein said vessel movable on said first and second track means are further characterized as being selectively positionable on the upper deck of said double deck part of said first and second track means for discharging the molten slag and metal into said entry aperture of said basin, and on the lower deck of said double deck part of said first and second track means for receiving the molten metal from said aperture at the nadir of said slanted floor of said basin.

* * * * *